United States Patent [19]

Hintze

[11] Patent Number: 4,982,178

[45] Date of Patent: Jan. 1, 1991

[54] SHADOW MASK COLOR SYSTEM WITH CALLIGRAPHIC DISPLAYS

[75] Inventor: Richard A. Hintze, Sandy, Utah

[73] Assignee: Evans & Sutherland Computer Corp., Salt Lake City, Utah

[21] Appl. No.: 909,522

[22] Filed: Sep. 19, 1986

Related U.S. Application Data

[60] Division of Ser. No. 608,637, Jun. 20, 1984, which is a continuation of Ser. No. 378,149, May 14, 1982, Pat. No. 4,499,457, which is a continuation of Ser. No. 948,734, Oct. 5, 1978, abandoned.

[51] Int. Cl.$^5$ .............................................. G09G 1/28
[52] U.S. Cl. .................................... 340/703; 340/732; 340/739; 315/368; 315/397
[58] Field of Search .................... 340/703, 732, 739; 315/368, 397

[56] References Cited

U.S. PATENT DOCUMENTS

| | | | |
|---|---|---|---|
| 3,577,031 | 5/1971 | Welsh et al. | 315/368 |
| 3,891,889 | 6/1975 | Fazio | 315/368 |
| 4,138,726 | 2/1979 | Girault et al. | 340/732 X |
| 4,200,866 | 4/1980 | Strathman | 340/703 |
| 4,203,051 | 5/1980 | Hallett et al. | 315/368 |

FOREIGN PATENT DOCUMENTS 2325028 12/1974 Fed. Rep. of Germany ...... 315/397

*Primary Examiner*—David Trafton
*Attorney, Agent, or Firm*—Nilsson, Robbins, Dalgarn, Berliner, Carson & Wurst

[57] ABSTRACT

A display system is disclosed utilizing a cathode ray display device utilizing three electron beams which are directed through a shadow mask to excite three-color phosphor dots, and which is incorporated in a system to alternately provide raster scan display signals and calligraphic display signals to obtain the benefits of both raster scan and calligraphic displays (dot or line drawings). A deflection unit is disclosed with the X and Y deflection coils each driven by two pairs of transistor circuits. The transistor circuits are controlled so that alternatively one transistor in each set passes current to provide bi-directional currents at desired levels to obtain specific beam displacement. A resistive element between individual deflection coils provides an indication of deflection current, which indication is processed by a differential amplifier to indicate displacement. In accordance with the instant position of the beam, a convergence unit is controlled to reflect spherical considerations. Specifically, the convergence of each color beam is varied in accordance with first and higher orders of X and Y displacement. Focus is controlled to avoid certain effects and obtain others.

6 Claims, No Drawings

SHADOW MASK COLOR SYSTEM WITH CALLIGRAPHIC DISPLAYS

This is a division of application Ser. No. 608,637, filed 6/20/84 which is a continuation of application Ser. No. 378,149 filed 5/14/82 now U.S. Pat. No. 4,499,457 which is a continuation of application Ser. No. 948,734 filed 10/5/78, abandoned.

BACKGROUND AND SUMMARY OF THE INVENTION

Electronic color display systems have come into widespread use in a variety of applications. In addition to the widespread use of commercial television, such systems are also employed widely for simulation, study, information transfer, design, and so on. To consider a specific exemplary application, such display systems are employed to provide the visual simulation in aviation pilot training units. In such an application, any of a variety of conditions or patterns can be simulated to afford a pilot flying experiences that might otherwise be very costly, difficult to obtain, or dangerous. For example, in addition to providing routine training in specific aircraft operating over specific terrain, simulators can give pilots the experience of such operations as a landing with retracted landing gear. Of course, the value of the experience is related to its realism. Accordingly, considerable effort has been made to accomplish stark realism, particularly with respect to the visual presentation which is perhaps the area of greatest human concentration. Prior video systems for use in aircraft simulators have utilized both the calligraphic and raster scan modes of operation. Generally, the raster scan mode of operation is in widespread use, as in color television, and is effective to display landscape and scenes. The raster scan display is also relatively convenient to tilt or rotate with respect to an artificial horizon, which is inherently necessary for the display of an aircraft simulator. Generally, the raster scan mode of operation has attained a degree of excellence in the use of shadow mask cathode ray tubes. However, the raster scan mode is not without limitations in various applications as the visual system of an aircraft simulator. Specifically, the raster scan mode tends to reproduce lines rather poorly if they are offset from the horizontal and the vertical. That is, diagonally extending lines in a raster scan image tend to reveal a staircase or staggered appearance. Also, in a shadow mask display, tilting the raster scan image from the horizontal tends to produce moire patterns which detract from the realism of the scene. In addition to these drawbacks, raster scan displays reproduce lights rather poorly. For example, in simulating an evening aircraft landing (a very desired simulation), the lights of the airport and surrounding area provide critical reference points. However, raster scan displays characteristically do not simulate such lights with the desired degree of realism.

The presentation of lights and lines in an electronic display is considerably improved in the calligraphic mode of operation. Therein, the beam is deflected from point to point to produce lines or dots as disclosed in the book *Principles of Interactive Computer Graphics* published in 1973 by McGraw-Hill Book Company, authored by Newman and Sproull. Such display systems have also been called "stroke writing systems", a form of which is disclosed in U.S. Pat. No. 3,775,760 entitled Cathode Ray Tube Stroke Writing Using Digital Techniques. While calligraphic modes of operation are effective for producing lights, as dots and lines, such displays involve serious color limitations and are complicated to formulate for depicting complete scenes. Consequently, both raster scan displays and calligraphic displays have involved substantial compromises in prior-art systems.

The foundation of the present invention is premised on the discovery that a shadow mask television display system can be alternatively driven with raster scan display signals and calligraphic display signals to accomplish a considerably improved visual display. In general, the effective realization of such a system required the solution of several inherent problems. For example, calligraphic display systems require effective control of beam deflection for movement from point to point. However, raster scan display systems require a high speed beam deflection pattern which is consistent and simply sweeps across the screen. In the operation of raster scan display systems, using a shadow mask, the individual beams are converged to pass through holes in the shadow mask, then diverge to individually excite specific color phosphor dots. In view of the repeating raster pattern, the convergence of the beams can be simply adjusted in accordance with the deflection in either the X or Y component direction. In some instances, the pattern of the shadow mask is varied to compensate for the spherical effects on the convergence of the beam. However, in the calligraphic mode of operation, the convergence is variously affected by hysteresis as well as the spherical effects with the result that previously known convergence techniques have not been adequate to enable calligraphic operation in a shadow mask cathode ray tube.

In addition to the above problems, certain special-effect problems have been recognized as somewhat inherent in cathode ray tube display systems. For example, difficulty has been experienced in providing the characteristics of realism for simulated lights, as in causing them to scintillate as well as to grow with perspective as the viewpoint is changed. The present system effectively solves such problems as well as the problems attendant combining calligraphic and raster displays along with the problem of moire patterns in a shadow mask cathode ray display.

In general, the present invention incorporates a cathode ray display device utilizing a shadow mask and a multiplicity of electron guns for providing color-associated electron beams to impact upon a target screen after passing through holes in the shadow mask. A deflection means is provided in the form of a controlled switching device which facilitates bi-directional currents through the deflection coils and affords fine beam positioning. A convergence system is provided to enable the use of the shadow mask for calligraphic displays and further for improving color presentations by considering higher order effects of displacement in either the X or Y component direction as related to each color beam. Finally, a focus control apparatus avoids certain undesirable effects and accomplishes certain desired effects including a variation in the beam focus depending upon the current mode of operation of the system.

BRIEF DESCRIPTION OF THE DRAWINGS

In the drawings, which constitute a part of this specification, an exemplary embodiment, demonstrating the various objectives and features hereof, is set forth as follows:

FIG. 1 depicts a color display system illustrating a color display as may be simulated in accordance with the present invention;

FIG. 2 is a block diagram of the system as depicted in FIG. 1;

FIG. 3 is a block and circuit diagram of a component block of the system illustrated in FIG. 2;

FIG. 4 is a block and circuit diagram of another component block illustrated in the system of FIG. 2;

FIG. 5 is a schematic sectional view through a cathode ray tube as depicted in FIG. 2;

FIG. 6 is a diagrammatic enlargement of a fragmentary area on the screen of the cathode ray tube depicted in the system of FIG. 2; and FIG. 7 is a block and circuit diagram of still another component in the system depicted in FIG. 2.

DESCRIPTION OF THE ILLUSTRATIVE EMBODIMENT

As indicated above, a detailed illustrative embodiment of the invention is disclosed herein. However, display systems may be embodied in accordance with various forms, some of which may be detailed rather differently from the disclosed embodiment. Consequently, the specific structural and functional details disclosed herein are merely representative, yet in that regard they are deemed to provide the best embodiment for purposes of disclosure and to provide the basis for the claims herein which define the scope of the present invention.

Referring initially to FIG. 1, a display is depicted on a screen 10 housed in a cabinet 12. In general, the system of the present invention may be variously embodied with the utilization of image splitters and various optical systems to attain the desired realism as viewed from a particular location as in a simulator cockpit. However, in the interests of simplicity, the system is depicted in FIG. 1 with the image appearing on the screen 10 at one side of the cabinet 12.

In the exemplary application of the present system, the image on the screen 10 simulates a view that is presented to a pilot in the course of landing an aircraft. In that regard, the pilot is presented a representation of a runway 14, a landscape including mountains 16, and lights 18. In accordance with the present invention and as disclosed in greater detail below, the lights 18 are provided in a calligraphic mode while the runway 14 and the mountains 16 are imaged by a raster scan mode. The image depicted on the screen 10 is accomplished by the excitation of phosphor dots of component colors by separate electron beams acting through a shadow mask.

Considering the system in somewhat greater physical detail, the screen 10 comprises the face of a cathode ray tube 20 (FIG. 2) as generally well known in the prior art. The tube 20 incorporates a shadow mask 22 and electron beam forming elements 24 (generally indicated) for providing three electron beams each of which is associated with a primary light color, e.g. red, green, blue.

The cathode ray tube 20 is also equipped with a deflection yoke 26 for scanning the beams over the screen 10 either in a raster or calligraphic patterns. Finally, the tube 20 is also fitted with a convergence yoke 28 which is somewhat modified from the traditional form of such apparatus. Specifically, as disclosed in detail below, the convergence yoke 28 includes structure for displacing the blue beam laterally.

In the operation of the tube 20, the electron beams are driven to excite phosphors on the screen 10 alternately in two modes of operation. That is, the beams are deflected in a raster pattern during one scansion of the screen 10 during which the runway 14 (FIG. 1) and mountains 16 are developed. During a following interval, the beams in the tube 20 (FIG. 2) are driven in a calligraphic mode to excite phosphors on the screen 10 to depict the lights 18 (FIG. 1) of the depicted scene. Thereafter, the mode would again involve a raster scan with the sequence continuing as a dynamic presentation indicative of the changing scene. In that regard, it is to be appreciated that simulation systems are well known in the field of computer graphics for developing signals to accomplish either a raster scan display or a calligraphic display (sometimes referred to as a line-drawing display). Such processors are described in the above-referenced book, *Principles of Interactive Computer Graphics*.

Turning now to the components of the system of FIG. 2, separate signal sources 30 and 32 (FIG. 2 left) are illustrated to provide raster display signals and calligraphic display signals respectively. Of course, in practice, these signals may be provided by a single computer facility as well known in the prior art and as described in the above-referenced book, *Principles of Interactive Computer Graphics;* however, not for use in the same system.

The signals from the sources 30 and 32 are applied to a sequencer and separator 34 which sequences the alternate mode of operation and segregates the signals into various separate components. That is, the mode alternates between raster scan and calligraphic display. Accordingly, a switch for the alternate signals is required. Specifically, video signals are supplied to a video amplifier 36 which in turn supplies signals to modulate the beams of the electron guns in the tube 20 as symbolically represented collectively by elements 38. Thus, just as in a conventional and traditional broadcast television receiver, the structure of the sequencer and separator 34 functions in a well known manner to provide separate signals for deflecting a cathode ray beam and for modulating the intensity of that beam. Traditionally, the deflection signals are ramp voltages while the modulating signals (video) are analogs of the dissected image. With respect to the well known calligraphic mode of operation as illustrated in the above-referenced book, *Principles of Interactive Computer Graphics* (page 26), digital data defining a specific display is reduced to deflection signals (X and Y) along with an unblanking signal for the control grid, elements 38. Such well known calligraphic display signals are provided from the source 32.

The conventional television signals and the calligraphic display signals, as described above, are simply sequenced by the sequencer and separator 34 so that the tube 20 is alternately actuated by the two types of display signals in alternate modes.

The sequencer and separator 34 provides deflection signals (X and Y components) to a deflection processing circuit 40 which in turn supplies the component signals to individual amplifier and driver circuits. Specifically, the X component is provided to a driver 42 while the Y component is provided to a driver 44. The X and Y drivers 42 and 44 are connected to the deflection yoke 26. Accordingly, the yoke 26 displaces the electron beam as to raster scan the beam over the screen 10 during raster scan operation and to move the beam in the desired vector or line pattern during a calligraphic display. Commensurate with such beam displacement or deflection, the video amplifier 36 controls the elements 38 to modulate the color beams and thereby accomplish the desired color display on the screen 10 as generally well known in the prior art.

As indicated above, a difficulty attendant the use of a shadow mask 22 in a system of calligraphic display has involved the problem of providing sufficient accuracy in deflecting the beam. The recognition and solution of that problem will be more apparent from a consideration of the detailed disclosure set forth below relating to the drivers 42 and 44.

Other problems, also as indicated above, attendant such operation have involved convergence and focus control. In that regard, the system of FIG. 2 includes a convergence unit 46 and a focus control circuit 48. The convergence unit 46 receives signals indicative of beam deflection (X and Y) through lines 50 and 52 from the drivers 42 and 44 respectively. From such signals, the convergence unit 46 develops special convergence signals for the individual electron beams. Specifically, convergence signals for the beams "red" and "green" are developed along with two convergence signals for the beam "blue" as described in detail below. The convergence unit 46 is also coupled to the control circuit 48 through a cable 54.

The focus control circuit 48 receives signals from the front end of the system, specifically including the sources 30 and 32 and the separator 34. From the received signals, the circuit 48 provides dynamic focus signals as indicated to be applied to the tube focusing elements 56 and also provides a power signal to the tube 10 as indicated through a conductor 58. The structural and operating details of the focus control circuit 48 are considered below.

Turning now to the deflection drivers 42 and 44, a representation of these similar circuits is illustrated in detail in FIG. 3 which will now be considered. Specifically, the X-component circuit is disclosed in FIG. 3 to which an input signal $X_i$ is indicated to be applied at deflection amplifer circuits 60. The signal $X_i$ is amplitude modulated to indicate a desired positive or negative displacement in the X-component direction for points of impact by the beams on the display screen.

Preliminary processing of the signal $X_i$ (as pin-cushion effect compensation) is performed in the circuits 60 to provide two pairs of output control signals. These signals manifest the desired direction and amplitude of current flow through the coils 62 and 64 which comprise the deflection yoke 26 (FIG. 2). The actual current $X_c$ in the coils 62 and 64 may be either positive or negative, as illustrated in FIG. 3, to accomplish displacement to the right or left from a center point on the screen. Of course, the amplitude of the current $X_c$ establishes the degree of beam displacement.

To accomplish variable bi-directional current flows through the coils 62 and 64, two pairs of semiconductor control paths are provided. Such paths would normally be provided by parallel sets of transistors to accommodate the desired currents. However, for simplicity of illustration herein, single transistor paths are depicted. Specifically, from a junction point 66 (left) connection is provided to a pair of transistors 68 and 70. Actually, the junction point 66 is connected through a resistor 72 to the emitter of the transistor 68 which has its collector connected to supply voltage and is controlled at the base electrode through a resistor 74. In a similar configuration, the junction point 66 is connected through a resistor 76 to the emitter of the transistor 70, which has its collector connected to ground and its base connected to receive a control signal through a resistor 78.

In the operation of the deflection driver system, one or the other of the pair of transistors (68 or 70) is conductive with the result that current flow is accommodated either to or from the junction point 66 either from the potential source applied at terminal 80 or to ground as indicated at 82. Thus, for a positive flow ($+X_c$) through the coils 62 and 64, current is provided through the transistor 68. For a negative current flow ($-X_c$), current flow is provided through the transistor 70. Of course, these currents are accommodated at the other side of the coils 62 and 64 by a similar pair of semiconductor control paths. Specifically, a junction path 84 (right from the coils 62 and 64) is connected through resistors 86 and 88 respectively to the emitters of transistors 90 and 92 (oppositely poled). The collector of the transistor 90 is connected to receive positive potential from the terminal 80, while the collector of the transistor 92 is connected to reference potential ground 82.

The base of the transistor 90 is connected through a resistor 94 to provide an input signal while the base of the transistor 92 is connected through a similar resistor 96 to perform a similar function. The complete flow paths for the currents $-X_c$ and $+X_c$ will now be apparent. Specifically, the current $+X_c$ flows through the transistor 68, the coils 62 and 64, then through the transistor 92. The opposite current $-X_c$ flows through the transistor 90, the coils 62 and 64 and the transistor 70. As indicated above, due to the current capacity limitation of devices, the transistors 68, 70, 90, and 92 each comprise a parallel set of transistors in practice to accommodate the desired levels of deflection current.

A resistor 98 is provided between the coils 62 and 64 for manifesting the actual current flow to a differential amplifier 100, thereby providing an indication of the actual deflection in the form of a signal $X_s$.

The transistors 68, 70, 90, and 92 are controlled by four deflection control amplifiers 102, 104, 106, and 108 respectively. Although these amplifiers accomplish small maintenance currents in the driver transistors, in the main, for any deflection, current is carried either by the transistors 68 and 92 or the transistors 70 and 90, depending upon the direction or sign of the deflection. Thus, one transistor in each pair conducts to provide the desired deflection current through the coils 62 and 64. In the conventional type deflection amplifier, only one transistor would be used to provide current in either direction, thus the entire power supply voltage would be applied to each transistor. In this circuit, the power supply voltage is divided equally across each of the conducting transistors 68 and 92 or 70 and 90. This technique allows using conventional type transistors to provide the necessary deflection voltage for shadow mask cathode ray tubes. Control of the deflection current is accomplished by four signals provided from the deflection amplifier circuits 60 to the similar individual amplifiers 102, 104, 106, and 108. Considering the amplifier 102 as representative, a signal is applied through a resistor 110 to the base of a transistor 112. The collector of the transistor 112 is connected to receive positive potential from the terminal 80 while the emitter of the transistor 112 is connected to provide an input to the transistor 68. Specifically, the emitter of the transistor 112 is connected to a junction point 114 which is connected to the resistor 74 and referenced through a resistor 116 to the junction point 66.

The amplifiers 106, 104, and 108 are similar to the amplifier 102, each incorporating a transistor as the control element. Specifically, the amplifiers 104, 106, and 108 incorporate transistors 118, 120, and 122 respectively. The amplifiers share some bypass elements. Specifically, an RC circuit 124 is provided between the bases of the transistors 112 and 118; and a capacitor 125 is connected between the emitters of the transistors 112 and 118. Similar elements are provided with respect to the transistors 90 and 92. Specifically, the emitters of the transistors 120 and 122 are connected to the junction 84 through resistors 127 and 129 respectively and together through a capacitor 131. The bases are interconnected through an RC circuit 133 and to the circuit 60 through input resistors 135 and 137.

Recapitulating to some extent, in the operation of the deflection driver as depicted in FIG. 3, the amplifier circuits 60 may provide certain well known correction, as for avoiding pin-cushion effects. Such corrections and apparatus therefor are well known in the prior art. The circuits 60 provide four output signals. To specify a desired deflection, at any given time, two of the signals are active while the other two signals are nil. That is, to specify a deflection to the right, a positive current $X_c$ is to be generated by turning on the transistors 68 and 92. Consequently, the amplifiers 102 and 108 are signaled to command the desired current flows through the transistors 68 and 92 to accomplish the desired current through the coils 62 and 64 and accordingly accomplish the desired deflection.

Conversely, a displacement of the beam to the left is accomplished by a negative current $(-X_c)$ which is provided by signaling the amplifiers 104 and 106 to turn on the transistors 90 and 70 to provide the desired current through the coils 62 and 64. Thus, fine control of deflection is accomplished without the momentum effect generally inherent in oscillatory deflection circuits. Further stability is provided in the driver by utilizing the current deflection signal $X_s$ applied as a negative feedback through a conductor 126 to the deflection amplifier circuits 60. The signal $X_s$ is also very important to provide accurate deflection information which is utilized in the operations of focusing and convergence as treated below.

Preliminary to considering the convergence unit 46 (FIG. 2), some preliminary definitions of signals will be helpful. Basically, a plurality of signals are developed which utilize the deflection signals $X_s$ and $Y_s$ (referred to hereinafter simply as X and Y) along with signal information developed therefrom indicative of the designated quadrant and hemisphere designated by the deflection. That is, in accordance with convention, the display screen is divided into four quadrants, $Q_1$, $Q_2$, $Q_3$, and $Q_4$. Furthermore, the screen is divided horizontally and vertically into hemispheres; specifically, a top hemisphere T, a bottom hemisphere B, a left hemisphere L, and a right hemisphere R. The quadrant and hemisphere information takes a binary form indicating that the signal either exists or does not exist. On the other hand, the manifestations of displacement X and Y take the form of analog signals. For example, a signal $XYQ_1$ manifests the product of X and Y; however, exists only during the interval when the deflection is in the first quadrant $Q_1$. In view of the above explanation, the following chart will summarize the signals generated for use in the system.

| Signal Designation | Explanation |
| --- | --- |
| $-XYQ_1$ | The negative product of X and Y effective only when deflection is in the first quadrant. |
| $-XYQ_2$ | The negative product of X and Y effective only when deflection is in the second quadrant. |
| $-XYQ_3$ | The negative product of X and Y effective only when deflection is in the third quadrant. |
| $-XYQ_4$ | The negative product of X and Y effective only when deflection is in the fourth quadrant. |
| $XYQ_1$ | The positive product of X and Y effectively only when deflection is in the first quadrant. |
| $XYQ_2$ | The positive product of X and Y effectively onlt when deflection is in the second quadrant. |
| $XYQ_3$ | The positive product of X and Y effectively only when deflection is in the third quadrant. |
| $XYQ_4$ | The positive product of X and Y effectively only when deflection is in the fourth quadrant. |
| $X^2L$ | The square of X effective only when deflection is in the left hemisphere. |
| $X^2R$ | The square of X effective only when deflection is in the right hemisphere. |
| $Y^2B$ | The square of Y effective only when deflection is in the bottom hemisphere. |
| $Y^2T$ | The square of Y effective only when deflection is in the top hemisphere. |
| $-XL$ | The negative value of X effective only when deflection is in the left hemisphere. |
| $-XR$ | The negative value of X effective only when deflection is in the right hemisphere. |
| XL | The positive value of X effective only when deflection is in the left hemisphere. |
| XR | The positive value of X effective only when deflection is in the right hemisphere. |
| $-YT$ | The negative value of Y effective only when deflection is in the top hemisphere. |
| $-YB$ | The negative value of Y effective only when deflection is in the bottom hemisphere. |
| YT | The positive value of Y effective only when deflection is in the top hemisphere. |
| YB | The positive value of Y effective only when deflection is in the bottom hemisphere. |

The signals as indicated in the above chart are employed in association with a plurality of constants for each convergence signal, i.e. red convergence, green convergence, blue convergence, and blue lateral convergence. Essentially, the convergence correction involves a formula of constants applied to the signals which may be stated mathematically as:

$$\frac{K_{1L}}{K_{1L}} \cdot X^2 \pm \frac{K_{2T}}{K_{2B}} \cdot Y^2 \pm \frac{K_{3Q1}}{\substack{K_{3Q2}\\K_{3Q3}\\K_{3Q4}}} \cdot XY \pm \frac{K_{4R}}{K_{4L}} \cdot X \pm \frac{K_{5T}}{K_{5B}} \cdot Y$$

The values of K are tuned constants associated with the signal values as indicated by the subscripts. The values X and Y are the deflection manifestations.

Thus, each of the convergence or correction signals is developed on the basis of the position of the beam (indicated in components of X and Y) and also on the basis of higher orders of such deflection, e.g. $X^2$, XY, and so on. The need for higher orders of correction stems from the spherical departure of the target configuration and the fact that corrections vary nonlinearly. However, it is also noteworthy that displacements along one coordinate impact upon correction in the other coordinate.

In addition to the correction based on linear and compound orders of displacement, correction is also provided for hysteresis effects. That is, correction is provided depending upon the immediately prior deflection of the beam in order to compensate for hysteresis in the deflection. To consider the structural details of the convergence unit, reference will now be made to FIG. 4.

The deflection-indicating signals X and Y are applied to a plurality of signal generators embodied in a block 128 (upper left). Essentially, the generators comprise digital and analog circuits as well known in the prior art for formulating signals as set forth in the above chart. Specifically, for example, the signal $-XYQ_1$ is timed to provide a nil value except during the interval when the deflection falls in the first quadrant and during that time, the amplitude of the signal manifests a negative value of the product of the X and Y component deflections. Thus, the chart signals are developed as indicated by their legends.

The individual signals from the signal generators 128 are applied through a symbolically represented cable 130 to individual convergence units. Specifically, the signals are applied to a red convergence unit 132 (shown in detail), a green convergence unit 134, a blue convergence unit 136, and a blue lateral convergence unit 138. The convergence units are similar with the consequence that only the unit 132 is shown in structural detail.

Within the convergence unit 132, there are two basic types of circuit connections. Specifically, ground-referenced adjustment circuits receive a single input signal while opposing signal-referenced circuits receive two signal inputs. The ground-referenced adjustment circuit 140 for the signal $X^2L$ is illustrated in detail to include a ground-referenced potentiometer 142 providing a tapped signal through a resistor 144.

Opposing signal-adjustment circuits are similar as represented for the signals XL and —XL. Specifically, such signals are applied to a circuit 146 across a potentiometer 148 from which a signal is tapped to be supplied through a resistor 150. The remaining adjustment or control circuits in the red convergence unit 132 are similar and are simply represented by a block and bear the label "control". These circuits each take the form of one or other of the circuits 140 or 146, depending upon whether a single input signal is provided or two input signals are provided.

The outputs from all of the adjustment or control circuits, e.g. circuits 140 and 146, are applied to a summing junction 152 which provides the input to a red convergence output amplifier 154 shown in detail and incorporating hysteresis correction. The convergence signals for the other colors are developed by similar structures represented by blocks. Specifically, the green convergence circuit 134 provides an output which is processed by a green output amplifier 156, while the blue convergence unit supplies an amplifier 158, and the blue lateral convergence unit supplies a blue lateral amplifier 160.

Considering the details of the output amplifiers as collectively represented by the red output circuit 154, the input signal is applied to an operational amplifier 162. The differential input to the amplifier 162 is ground referenced through a resistor 164 and feedback paths are provided through a capacitor 166 connected in parallel with a pair of series resistors 168 and 170. The junction point between the resistors 168 and 170 is connected to three parallel RC circuits 171, 172, and 173 which are referenced to ground potential. The three RC circuits 171, 172, and 173 simulate the hysteresis or B-H curve to correct the convergence signal based upon its recent history. The individual corrections are summed by the amplifier 162 and adjusted in accordance with the prior state of the signal to reflect hysteresis correction. Consequently, the output from the amplifier 154 is provided in a conductor 175 to manifest the red convergence signal.

From the above description, it may be seen that a number of factors are included in the determination and provision of the convergence signal, including nonlinear or higher order factors as $X^2$, XY, and so on. The constants for varying the application of such factors are provided by the potentiometers in the adjustment or control circuits (e.g. 140 and 146) of the convergence units. Specifically, one constant for $X^2$ is used while deflection is to the left of center and is provided by the potentiometer 142 (FIG. 4). Similarly, the constant for the positive or negative value of X while the signal is to the left of center is provided by the potentiometer 148. Thus, in essence, the deflection is tuned for each quadrant of deflection by adjusting each of the potentiometers in the individual adjustment or control circuits within the convergence units for each of the beams. In that regard, note that the blue convergence involves two separate output signals which results from the fact that traditionally blue convergence facilitates no lateral adjustment. The added deflection structure with respect to the blue beam is illustrated in FIG. 5 and will now be considered.

Referring to FIG. 5, the neck 176 of the tube 20 (FIG. 2) is depicted in section to illustrate the beam convergence elements. The symbolically represented elements 178 afford convergence control for the green beam while the elements 180 accommodate the red beam. Additionally, the elements 182 provide convergence for the blue beam; however, conventionally since the blue beam is the center reference, only vertical displacement (Y) is provided.

In accordance with the present invention, wherein calligraphic or line vector drawings are developed through a shadow mask, lateral convergence correction of the blue beam is provided. Accordingly, a blue lateral deflection coil 184 is mounted contiguous to the neck 176 of the tube 20 just exterior of the blue elements 182. The coil 184 is connected to receive the blue lateral convergence signal formulated as described with reference to FIG. 4. Accordingly, both X and Y convergence correction is -provided for each of the three color beams.

In the operation of a system of the present invention, initial tuning involves adjusting the potentiometers (e.g. potentiometers 142 and 148 FIG. 4) for each of the convergence units, specifically convergence units 132, 134, 136, and 138. Such adjustment is accomplished by deflecting the beam to a quadrant or hemisphere in which the signal is active, then tuning the associated potentiometer to attain the desired color purity. Of course, once such convergence tuning has been accomplished, the system can be expected to maintain consistent operation for a substantial period of time. The important consideration to be noted is the fact that higher order phenomena of beam displacement is important in the convergence correction.

As indicated above, the system of the present invention is capable of eliminating certain special effects previously considered detrimental and accomplishing certain other special effects previously considered desirable. Specifically, reference is made to moire patterns in raster scan operation, light scintillation, perspective growth, and so on. An initial consideration involves the fact that a different focus is desired for raster scan operation than is desired for calligraphic display operation. Accordingly, depending upon the mode of operation (calligraphic or raster scan), the focus of the individual beams in the tube 20 should be modified. More specifically, in the raster scan mode of operation the beams should be under focused, the lack of sharp focus serving to blend individual scanning lines together, improving the composite image. Conversely, during the calligraphic mode, when pinpoint lights and lines are simulated on the screen, the beams should be overfocused; however, more sharply focused to obtain the desired effects. Consequently, depending upon the mode of operation the focus of the beams is modified from a generally overfocused state during calligraphic operation to a generally underfocused state during raster scan operation.

During angular rotation with raster scan operation, it has been determined that moire patterns can be significantly reduced by varying the focus of the beams. These patterns usually detract from the image during roll angle or angular offset between the raster pattern and the shadow mask. In general, critical angles of raster rotation involve tuning. In that regard, the beam is generally further underfocused at angles of rotation which tend to present moire patterns.

Other effects which relate to focusing are the brightness or intensity of a current image component and the perspective growth of an image component. For example, dimming lights depicted in an image should be progressively more defocused to eliminate the consequence that eventually such lights become so dim and small (due to decreasing beam size) that they begin to scintillate excessively. A similar criteria exists with respect to the remoteness of the lights from the simulated viewpoint. That is, very remote lights tend to become exceedingly dim and small and accordingly begin to scintillate thus requiring that they be progressively more overfocused during the calligraphic mode of operation. Since light scintillation is a real world phenomenon, proper control of focus to produce some scintillation provides a unique feature.

These various considerations are combined in the system of the present invention to provide an output indicative of the desired focus of the beams, which special effect focus is then combined with focus corrections based upon the square ($X^2$) of the abscissa deflection and the square ($Y^2$) of the ordinate deflection to compensate spherical offset.

Preliminary to considering the structure of the focusing control circuit in detail, reference will be made to the diagram of FIG. 6. A color dot triad is represented including a red dot 186, a blue dot 188, and a green dot 190. A hole 192 in the shadow mask (offset from the dots) is also represented in FIG. 6 suggesting the manner in which angularly offset color beams pass through the shadow mask to selectively excite a particularly color dot. It may be seen from the figure that depending upon the focus of the beams, the color dots may radiate light over a varying surface area (more or fewer dots excited). That is, the more sharply focused the beams are at the point of impingement on the screen, the smaller the area of excitation and illumination. Accordingly, it may be seen that in simulating lights, dimmer and more remote lights should be progressively defocused as also should occur in raster presentation with roll angles to avoid moire patterns. It will thus be apparent that defocusing has the effect of diminishing the line scanning pattern of raster scan operation.

Considering the structure of the focusing circuit 48, signals indicative of beam intensity, mode of operation, depth of view and roll angle, are available as described herein or well known in the art and all applied to an effects focus signal generator 194 (FIG. 7). The generator 194 may take a variety of forms varying from rather elaborate digital-analog simulation means to a simple signal scaler for combining the individual received components to accomplish a desired compromise i.e. a circuit for summing voltages. That is, in accordance with conventional terminology, the scaler changes the signal representations by a factor then the signals are simply combined additively.

First, the signal applied at the terminal 196 is binary in nature commanding substantial underfocusing for a raster mode of operation and substantial overfocusing for calligraphic mode of operation. As indicated above, the signal is available from the sequencer and separator 34 (FIG. 2). A signal indicative of beam intensity from the same source is applied at the terminal 198 being continuously variable to provide an effect upon the focusing. Again, brighter display commands a higher degree of focus. Somewhat similarly, a continuous signal is provided at a terminal 200 indicative of the viewing distance to the simulated object. The signal is the so-called Z signal from the source 32 as well known in the art. As the distance increases, the focusing signal defocuses. Finally, a selective range of signals may be provided at the terminal 202 to indicate critical areas of moire patterns which should cause defocusing. As indicated in FIG. 2, such signals are available from the source 30.

The signals applied at the terminals 198, 200, and 202 may be combined either positively or negatively with the basic mode signal which commands either an underfocused or overfocused state. Accordingly, the individual signals are summed within the generator 194 to provide an output to a ground-referenced potentiometer 204 for supplying one component input to an amplifier 206. Two other inputs are provided to the amplifier 206, from potentiometers 208 and 210 which receive the signals $X^2$ and $Y^2$ (development explained above) from the convergence unit 46 (FIG. 2). These signals adjust the focus to compensate for the fact that the beam travels a progressively greater distance with greater deflections (the screen radius not being the same as the beam deflection radius) and thereby accomplishing true compensation in accordance with the square of the deflection.

The individual inputs are summed by the amplifier 206 (FIG. 7) and applied to an operational amplifier 212 which is in turn connected to drive a power supply 214. Thus, the focusing energy is provided from the power supply 214 to accomplish the desired effects with operating conditions and the squares of the displacement or deflection components.

Considering the operation of the system in view of the above structural details, it may now be seen that the display on the screen 10 (FIG. 1) is provided alternatively by a raster scan mode of operation and a calligraphic display operation. During the raster scan pattern of operation, the electron beams are somewhat underfocused and convergence correction is fully applicable to accomplish improved color registration. Following such operation, during a calligraphic display mode, the deflection is from point to point with the deflection circuits affording the necessary point-to-point control. At such points, the lights 18 are provided in the raster-developed scene including the runway 14 and the mountains 16. For the random pattern movements (encountered in calligraphic operation) the convergence is maintained by the convergence unit as set forth in considerable detail above affording the desired color purity. Again, the focusing considerations are also applicable. Thus, by enabling the combination of a calligraphic display along with a raster scan display in a color mask system, the present invention affords effective displays of landscapes and the like which may be conveniently tilted or rotated and which can be effectively simulated and processed in accordance with well known computer graphics techniques. Furthermore, the system affords realistic light displays which are possible by use of calligraphic display techniques in a shadow mask structure. The consequence is a particularly effective system for the simulation of graphics, including the simulation of visual displays for aircraft simulators. Essentially, a full range of color presentation is available with a relatively high degree of color registration and without undue pattern or moire effects. Relatively complicated scenes may be provided with a reasonable computation facility, the various display elements being effectively and compatibly merged into a realistic display. Recognizing the widely varying possibilities for utilization of the structures and techniques disclosed herein, the scope hereof is understood to be determined in accordance with the claims as set forth below.

What is claimed is:

1. A color display system for providing a dynamic color presentation comprising:
    a display device incorporating a three color screen, multiple beam excitation means for providing three color beams for the excitation of said screen, and coordinate deflection means for said excitation beams in combination with a color screen;
    means for providing calligraphic display signals for modulating said beam excitation means to produce a display;
    driver means for said deflection means to deflect said beams relative to said screen whereby to accommodate said calligraphic display signals;
    a plurality of independent color-convergence tuning control means for each of said beams;
    means for selectively providing correction signals to each of said plurality of control means including at least four coordinate quadrant correction signals, one for each coordinate quadrant of said screen, said quadrant correction signals each having value only when said beams are deflected to the quadrant; and
    means for summing the outputs of said control means for each of said beams to provide convergence signal for each of said beams.

2. A color display system according to claim 1 wherein said correction signals are representative of orders of coordinate deflection of said beams as provided by said driver means.

3. A color display system according to claim 2 wherein said correction signals include signals representative of at least two orders of coordinate deflection values.

4. A color display system according to claim 1 further including a second plurality of independent color-convergence tuning control means for one of said three color beams.

5. A color display system according to claim 1 wherein said means for selectively providing correction signals further includes means for providing at least two hemisphere correction signals, one for each coordinate half of said screen, said hemisphere correction signals having value only when said beams are deflected to the hemisphere.

6. A color display system for providing a dynamic color presentation comprising:
    a display device incorporating a three color screen, multiple beam excitation means for providing three color beams for the excitation of said screen, and coordinate deflection means for said excitation beams in combination with a color screen;
    means for providing calligraphic display signals for modulating said beam excitation means to produce a display;
    driver means for said deflection means to deflect said beams relative to said screen whereby to accommodate said calligraphic display signals;
    a plurality of independent color-convergence tuning control means for each of said beams;
    means for selectively providing correction signals to each of said plurality of control means, including at least two coordinate hemisphere correction signals, one for each hemisphere of said screen, said hemisphere correction signals each having value only when said beams are deflected to the hemisphere; and
    means for summing the outputs of said control means for each of said beams to provide convergence signals for each of said beams.

* * * * *